United States Patent
Unnikrishnan et al.

(10) Patent No.: US 11,038,755 B1
(45) Date of Patent: Jun. 15, 2021

(54) COMPUTING AND IMPLEMENTING A REMAINING AVAILABLE BUDGET IN A CLOUD BURSTING ENVIRONMENT

(71) Applicant: INTERNATIONAL BUSINESS MACHINES CORPORATION, Armonk, NY (US)

(72) Inventors: Priya Unnikrishnan, Toronto (CA); Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/690,244

(22) Filed: Nov. 21, 2019

(51) Int. Cl.
| | |
|---|---|
| *H04L 12/24* | (2006.01) |
| *G06F 9/50* | (2006.01) |
| *G06N 20/00* | (2019.01) |
| *H04L 12/911* | (2013.01) |
| *H04L 29/08* | (2006.01) |

(52) U.S. Cl.
CPC ........ *H04L 41/0823* (2013.01); *G06F 9/5011* (2013.01); *G06N 20/00* (2019.01); *H04L 41/0806* (2013.01); *H04L 41/142* (2013.01); *H04L 41/5003* (2013.01); *H04L 47/82* (2013.01); *H04L 67/10* (2013.01)

(58) Field of Classification Search
CPC ............. H04L 41/0823; H04L 41/0806; H04L 41/142; H04L 41/5003; H04L 47/81; H04L 67/10; G06N 20/00; G06F 9/5011
See application file for complete search history.

(56) References Cited

U.S. PATENT DOCUMENTS

| | | | |
|---|---|---|---|
| 8,095,929 B1 | 1/2012 | Ji et al. | |
| 8,631,458 B1 | 1/2014 | Banerjee | |
| 9,606,828 B2 | 3/2017 | Ghosh et al. | |
| 9,712,591 B2 | 7/2017 | Bragstad et al. | |
| 9,818,127 B2 | 11/2017 | Iyoob et al. | |
| 9,935,894 B2* | 4/2018 | Melander | G06F 9/5044 |
| 10,129,177 B2* | 11/2018 | Chang | H04L 12/66 |
| 10,205,677 B2* | 2/2019 | Udupi | H04L 47/78 |
| 10,235,640 B2 | 3/2019 | Devarakoda et al. | |
| 10,346,775 B1* | 7/2019 | Xu | G06Q 10/06315 |
| 10,673,952 B1* | 6/2020 | Cohen | H04L 67/32 |
| 2011/0313902 A1 | 12/2011 | Liu et al. | |
| 2012/0072985 A1* | 3/2012 | Davne | H04L 63/20 726/22 |
| 2012/0222041 A1* | 8/2012 | Sabin | G06F 9/5083 718/105 |
| 2012/0254433 A1* | 10/2012 | Gujral | G06F 9/5072 709/226 |

(Continued)

*Primary Examiner* — Blake J Rubin
(74) *Attorney, Agent, or Firm* — Griffiths & Seaton PLLC

(57) ABSTRACT

Calculating a remaining budget in a cloud bursting environment, by a processor. Within a particular time window, a first cost is computed of allocated and released cloud hosts. A second cost is computed of the cloud hosts that are allocated and not yet released. A remaining budget is computed as a difference between a budget limit and a sum of the first cost and the second cost, at the current point in time. A third, estimated cost of allocated and not yet released cloud hosts; and a fourth, estimated cost of cloud host requests currently in progress are each then determined. A safe remaining budget is then computed by subtracting the third and fourth estimated costs from the remaining budget determined prior.

21 Claims, 10 Drawing Sheets

(56) References Cited

U.S. PATENT DOCUMENTS

| | | | |
|---|---|---|---|
| 2014/0280961 A1* | 9/2014 | Martinez | H04L 41/5054 709/226 |
| 2015/0222723 A1 | 8/2015 | Adapalli et al. | |
| 2016/0094483 A1* | 3/2016 | Johnston | G06F 8/65 709/226 |
| 2017/0063614 A1* | 3/2017 | Hartwig | H04L 41/0886 |
| 2017/0366606 A1* | 12/2017 | Ben-Shaul | G06F 3/064 |
| 2020/0034057 A1* | 1/2020 | Srinivasan | G06F 3/0665 |
| 2020/0314175 A1* | 10/2020 | Dailianas | G06F 9/45558 |

* cited by examiner

COMPUTING AND IMPLEMENTING A REMAINING AVAILABLE BUDGET IN A CLOUD BURSTING ENVIRONMENT

BACKGROUND OF THE INVENTION

Field of the Invention

The present invention relates to cloud computing, and more specifically to exemplary embodiments for computing and implementing budget restrictions in infrastructure as a service (IaaS) and platform as a service (PaaS) systems.

Description of the Related Art

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together and provided to a client or an end user. Cloud computing is often provided "as a service" over the Internet. Two distinct layers of such services in cloud computing can be in the form of the infrastructure as a service (IaaS) layer and the platform as a service (PaaS) layer.

The PaaS layer is a combination of a development platform and a set of software subsystems or components that may be used to deliver a fully functional product or service. It provides a platform on which software developers may build new applications or extend existing ones without the complexity of owning and managing the underlying hardware and software and provisioning hosting capabilities. In other words, the PaaS layer provides the supporting platform to enable the end user to develop his or her own solutions.

The IaaS layer delivers computer infrastructure, including a virtualization environment, as a service. This may include servers, software, data-center space and network equipment, available in a single bundle and may be billed as per usage in a utility computing model. IaaS may generally be used by organizations that have the in-house expertise to manage their IT requirements but may not have the infrastructure. They may hire the infrastructure from IaaS providers and load up their libraries, applications, and data, after which they may configure them themselves.

SUMMARY OF THE INVENTION

Various embodiments for calculating a remaining budget in a cloud bursting environment are provided. In one embodiment, in response to receiving information including a defined time window and a budget limit associated with the time window, allocated and released cloud hosts are identified at a current point in time. A first cost is computed of the allocated and released cloud hosts at the current point in time. Cloud hosts that are allocated and not yet released are identified, at the current point in time. A second cost is computed of the cloud hosts that are allocated and not yet released at the current point in time. A remaining budget is computed as a difference between the budget limit and a sum of the first cost of allocated and released cloud hosts at the current point in time and the second cost of cloud hosts that are allocated and not yet released at the current point in time. A third, estimated cost of allocated and not yet released cloud hosts; and a fourth, estimated cost of cloud host requests currently in progress are each then determined. A safe remaining budget is then computed by subtracting the third and fourth estimated costs from the remaining budget determined prior.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

System Description

Figure 1:
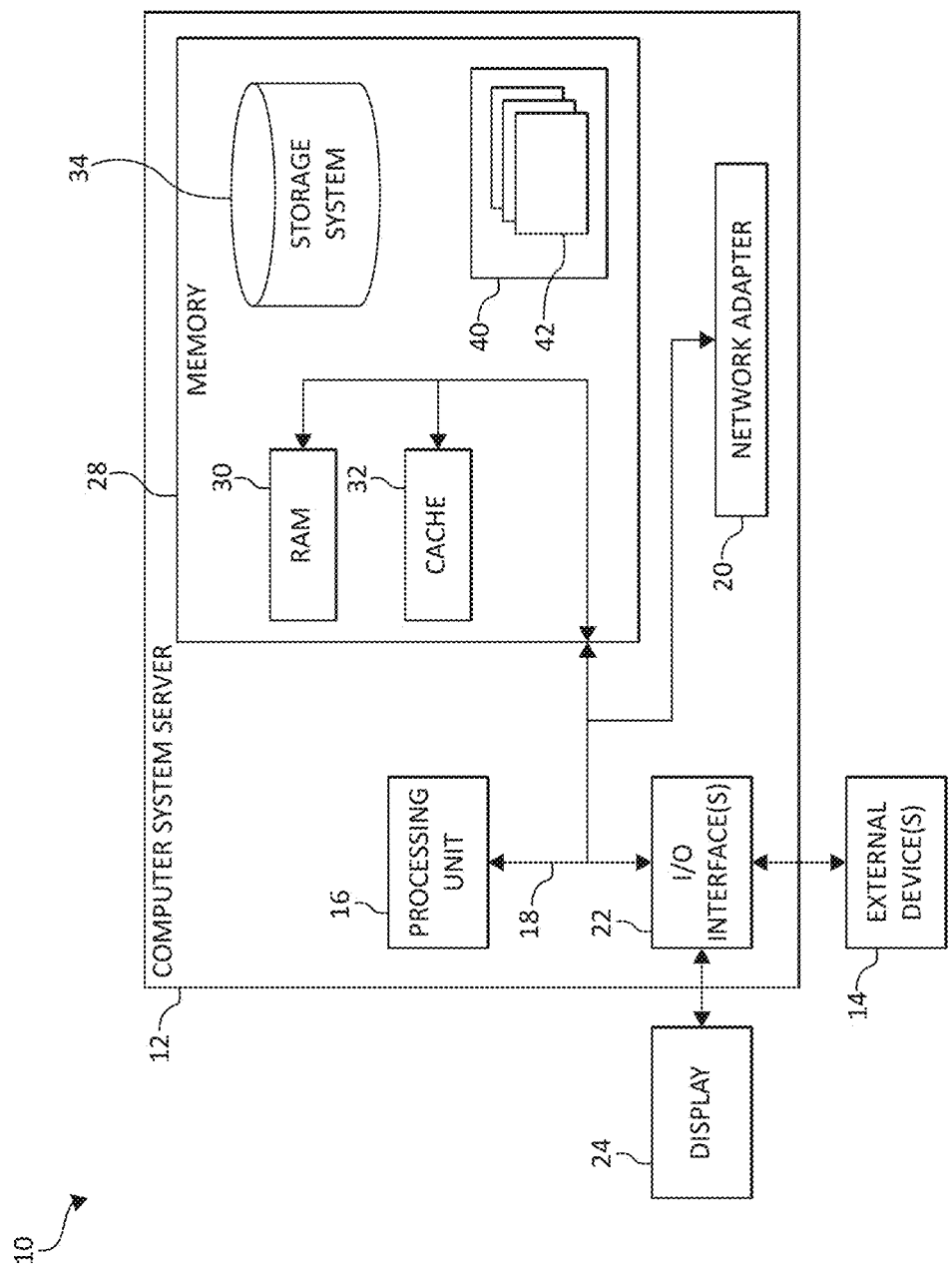
FIG. 1 is a block diagram depicting an exemplary computing node, according to embodiments of the present invention.

It is understood in advance that although this disclosure includes a detailed description on cloud computing, implementation of the teachings recited herein are not limited to a cloud computing environment and/or computing systems associated with cloud bursting mechanisms. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
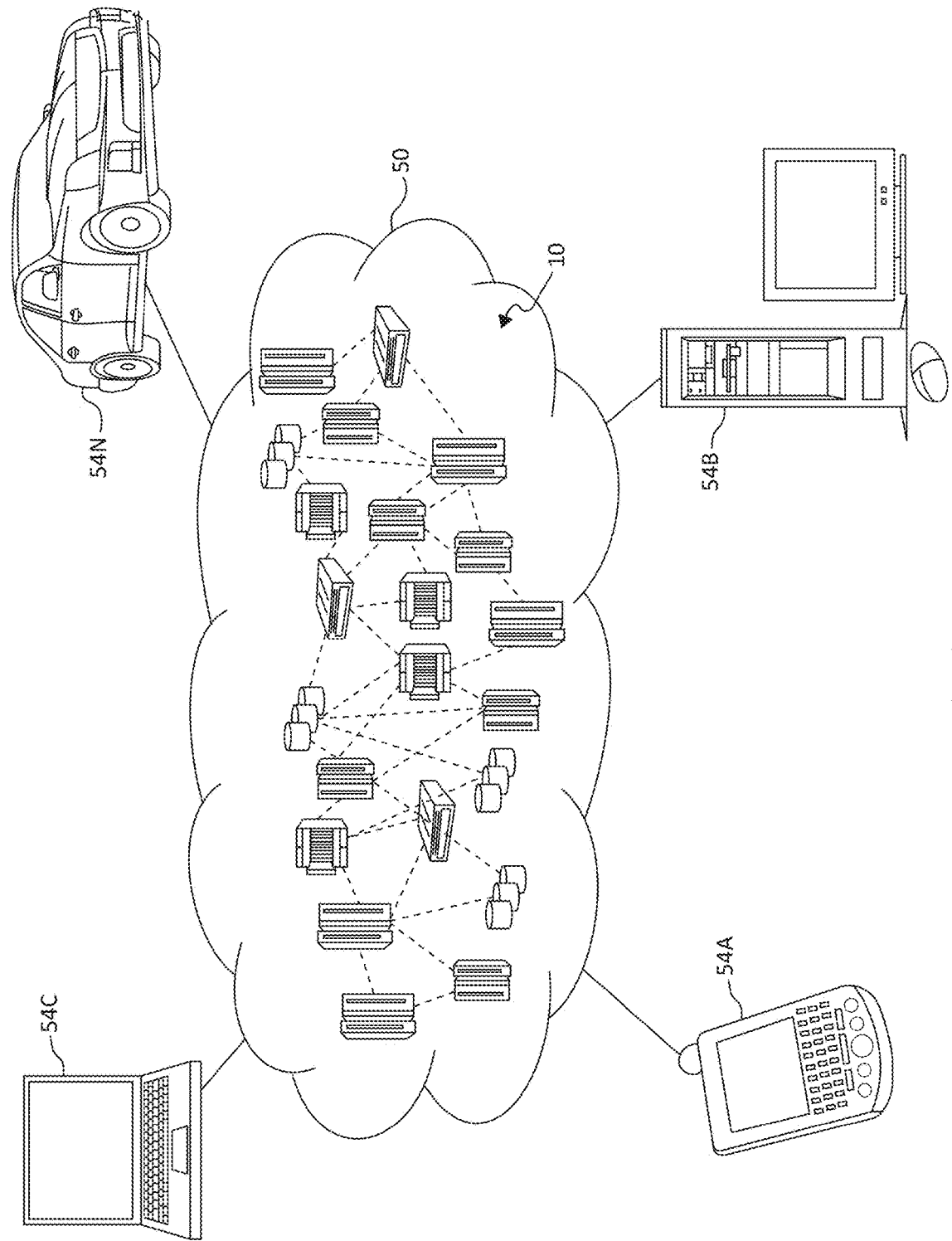
FIG. 2 is a block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
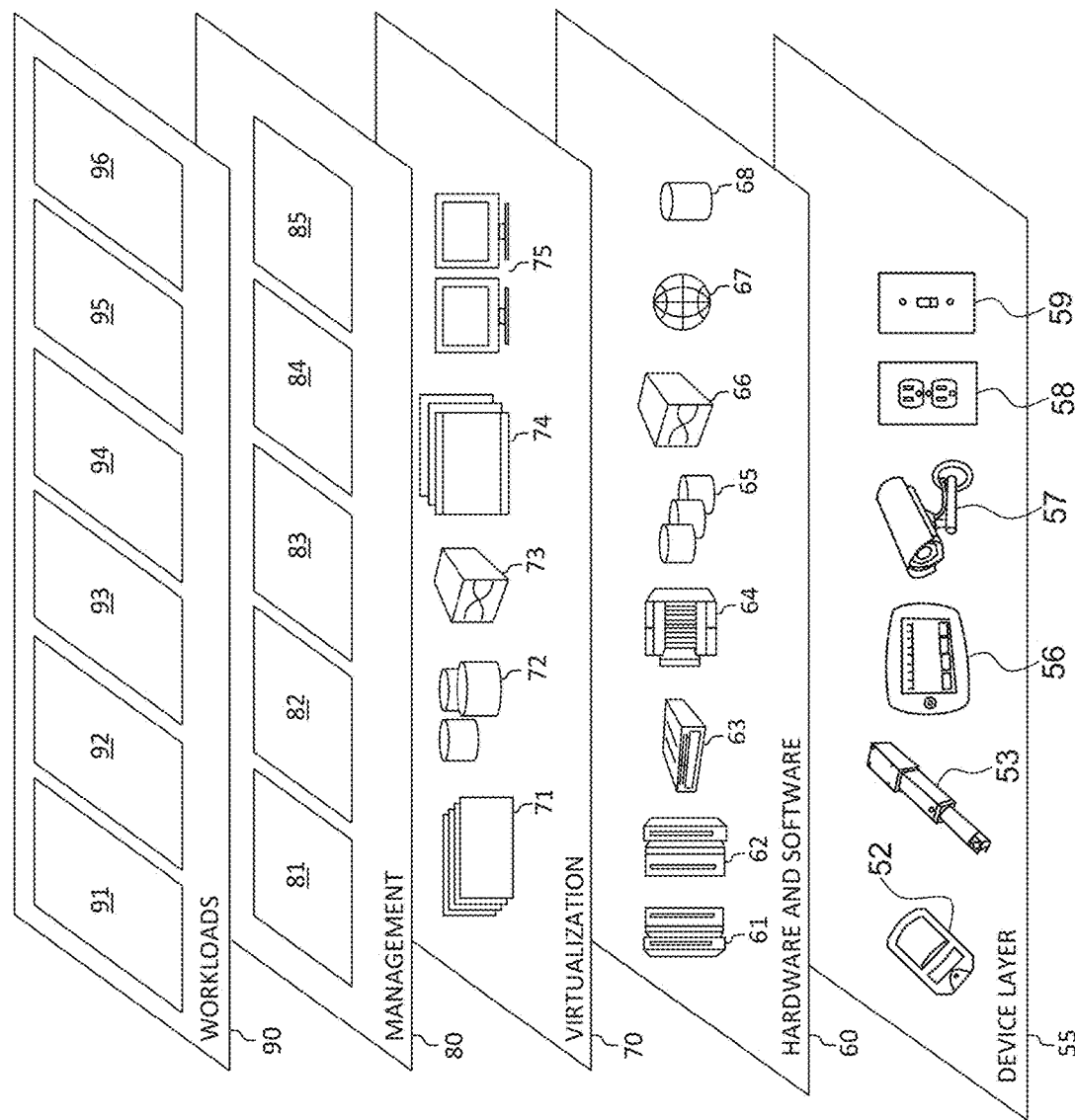
FIG. 3 is a block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various cloud budget analyzation and optimization functions 96. One of ordinary skill in the art will appreciate that the cloud budget analyzation and optimization functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Computing and Implementing Budgets Utilization in a Cloud Bursting Mechanism

Figure 4:
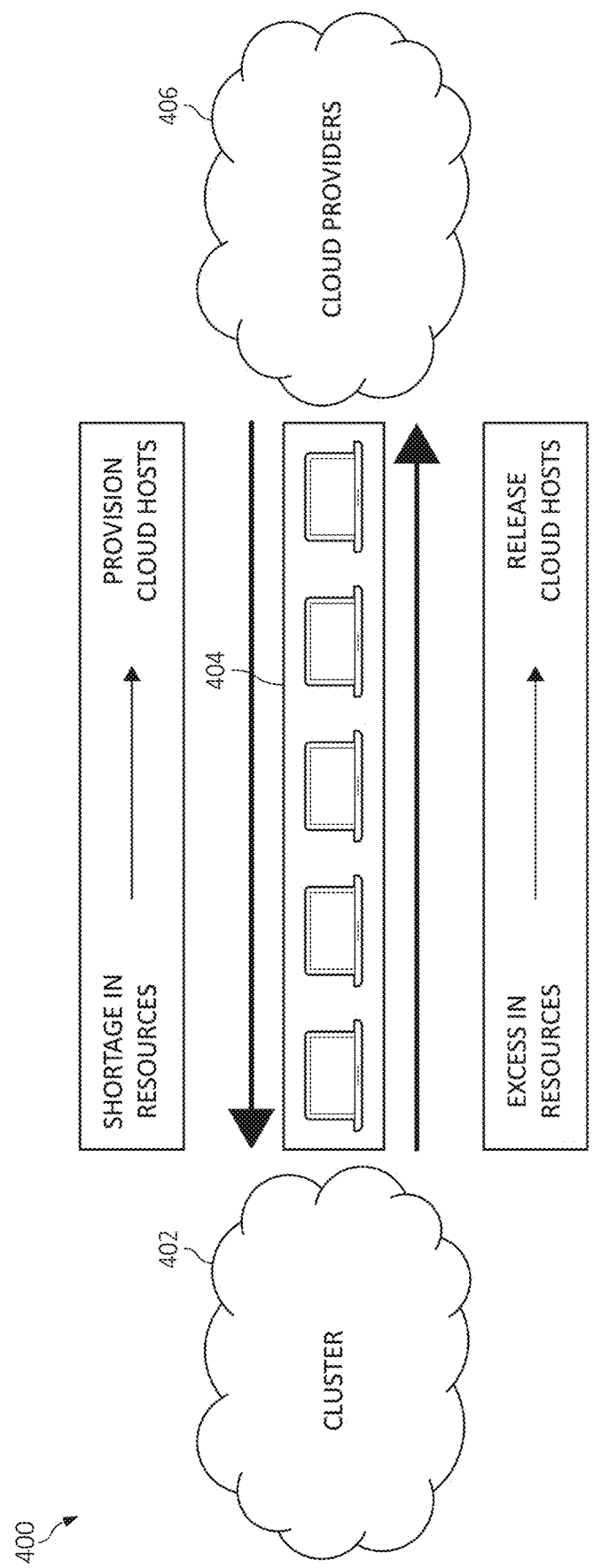
FIG. 4 is a block diagram depicting a cloud bursting environment, according to embodiments of the present invention.

Cloud bursting is the operation of offloading workloads from local hosts to cloud hosts. Essentially, when workload resource demand exceeds the capacity of resources in a local cluster, additional cloud hosts are provisioned and added to the cluster to meet the resource demand. When there is excess capacity in allocated cloud hosts, this excess capacity is released to the cloud providers. This process is illustrated in the cloud bursting mechanism 400 of FIG. 4, where a local cluster 402 is provisioned or allocated cloud hosts 404 from cloud providers 406 upon encountering workloads demanding more resources than the local cluster 402 can provide, and similarly, the cloud hosts 404 are released from the local cluster 402 back to the cloud providers 406 subsequent to the workload demand being satisfied. It should be noted that the present disclosure refers to cloud hosts generally as reference 404. In respective implementations, these cloud hosts 404 may comprise hosts which are currently allocated to the local cluster 402, hosts which are requested from cloud providers 406 but not yet allocated to the local cluster 402, or hosts that were previously allocated to the local cluster 402 which are now released back to the cloud providers 406.

The cloud bursting capability provides several benefits. Cost savings is one of the prominent benefits. Rather than spend the money to build and maintain infrastructure to accommodate spikes in resource usage that occur only occasionally, the cloud bursting environment enables the offload of workloads from the local infrastructure (local cluster 402) to cloud hosts 404, and therefore the additional infrastructure is paid for only when it is needed, thereby reducing the total cost of ownership. Another benefit is the flexibility to use multiple cloud providers 406 (e.g., different companies) and different types of infrastructures and resources, depending on considerations such as workload requirements and cost. Improved security is an additional benefit. Cloud providers 406 can offer increased security, isolation of servers, and communication over a private network. Combining local and cloud resources can utilize this functionality to address security and compliance aspects for their workloads. Finally, among other benefits, the cloud bursting environment provides scalability by extending the local cluster 402 dynamically to cloud providers 406. In addition, by leveraging resources of cloud providers 406 using the cloud bursting mechanism 400, the exposure to outages and downtime can be mitigated.

In the cloud bursting environment, there are several problems related to meeting budget constraints, as cloud resources are inherently (monetarily) expensive. Organizations utilizing these types of systems generally have predetermined budget limits for a defined duration of time (e.g., monthly or annually). Further complicating matters is that the overall organizational budget may be divided and shared among functional units. These budget limits may be hard limits (that cannot be exceeded) or soft limits (that can be exceeded and/or carried over). Efficiently utilizing the allocated cloud budget is a challenging problem for organizations, with one key element being there currently is no reliable way to calculate a remaining budget at any instant in time. That is, given a budget for the defined duration of time (e.g., a month), at any given instant in time within the month there is currently no optimized solution to determine what budget amount remains for the duration of the month. In this way, it is difficult to plan allocations for the remaining portion of the defined duration of time so as to most optimally utilize resource allocations within the budget limit(s). Further, commensurate with computing the remaining available budget for the defined duration of time, an additional challenge is selecting an optimal combination of cloud resources (both in terms of quantity and quality of those resources) within hard and/or soft budget constraints.

In existing commercial cloud bursting implementations, an administrator is heavily relied upon to identify the shortage or excess of resources within the local cluster 402. Moreover, the administrator is relied upon to monitor budget spending for cloud resources utilizing monitoring tools (e.g., applications), and trigger the provisioning and release of cloud hosts 404 from the cloud providers 406 to the local cluster 402 while staying within the stipulated budget limits. While some existing literature has addressed aspects of these challenges, existing techniques typically require budget distribution at an application level and down to the job and task level. Because of this, the existing solutions do not address cloud budgeting at an organizational or functional unit level where the budget may apply to cloud resource usage for a defined duration irrespective of the applications utilizing the cloud resources. Further, these existing implementations typically focus on the application and scheduling of application tasks with a goal of minimizing the application completion time within the application budget constraints. Therefore, these techniques do not address the challenges faced by cluster administrators with respect to reigning in cloud utilization to meet budget constraints at a higher level.

Accordingly, the present invention considers novel techniques to monitor and calculate a safe and reliable remaining cloud bursting budget for a defined duration of time (i.e., within a current window of time) such that the local cluster 402 may be enabled to automatically provision the most optimal cloud hosts 404 and/or resources from cloud providers 406 during a cloud burst operation.

Figure 5:
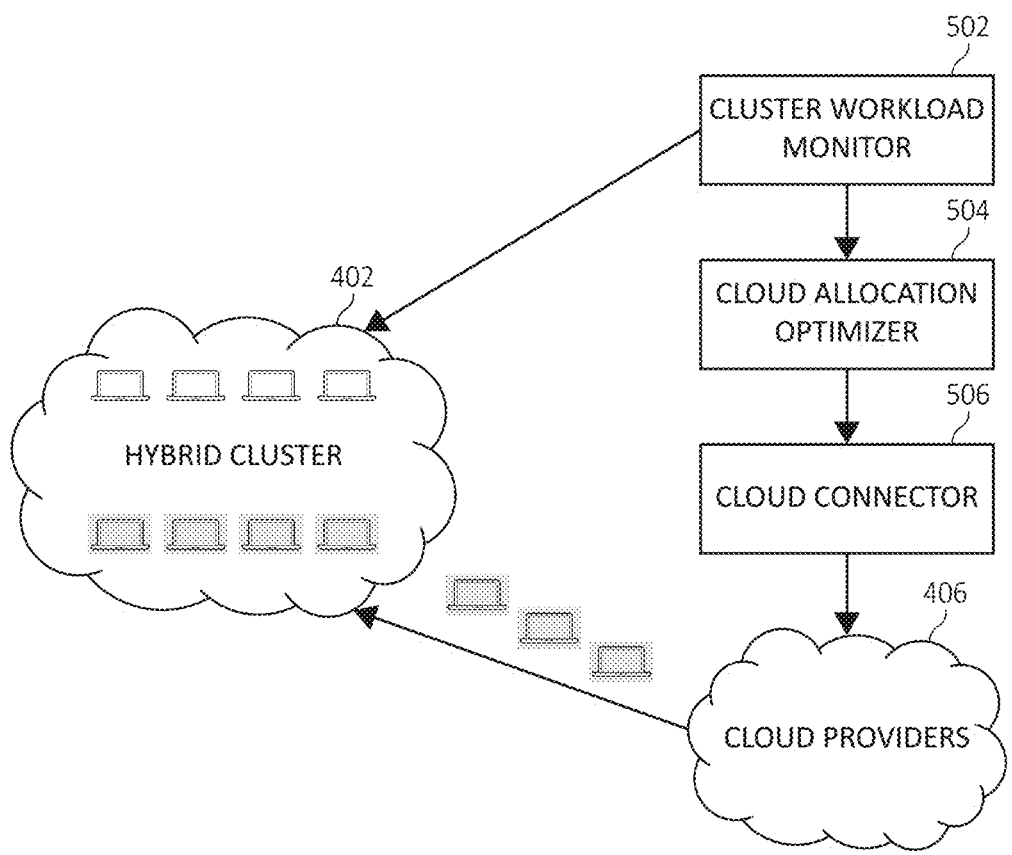
FIG. 5 is a block diagram depicting a system overview of a cloud bursting mechanism, according to embodiments of the present invention.

In conjunction with these techniques, several functional components are considered, including the cloud bursting mechanism 400 which is typically composed of various elements as illustrated in the components 500 of the cloud bursting mechanism 400, in FIG. 5. The components 500 may include the local (hybrid) cluster 402 and cloud providers 406, which as aforementioned, provision and release cloud hosts 404 therebetween as cloud resources to enable the execution of a high-demand workload. The components 500 may additionally include a cluster workload monitor 502 which monitors the workload in the local cluster 402 and generates cloud resource requests required to meet the workload SLA. A cloud allocation optimizer 504 may be included, which aggregates and optimizes all cloud resource requests triggered by the cluster workload monitor 502. The cloud allocation optimizer 504 may function to optimize and regulate cloud usage to satisfy resource and budget constraints for the local cluster 402. Further, the components 500 may include a cloud connector 506, which connects with external cloud providers 406 using cloud provider application programming interfaces (APIs) to trigger resource provisioning on the cloud.

Figure 6:
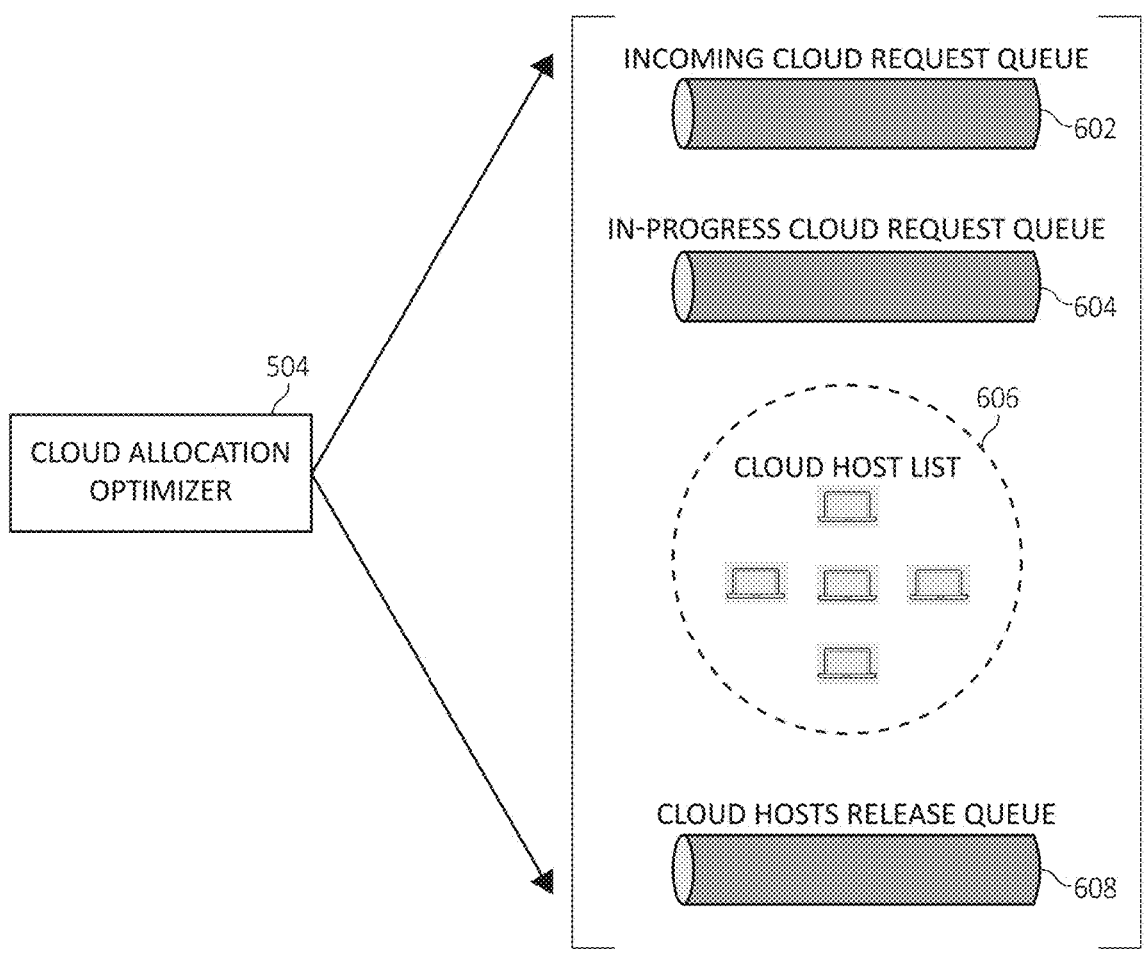
FIG. 6 is a block diagram depicting data structures for monitoring cloud activity in a cluster, according to embodiments of the present invention.

Turning now to FIG. 6, the cloud allocation optimizer 504 may be part of a generic system implementing cloud bursting functionality having various data structures 600 maintained for tracking and monitoring cloud activity in the local cluster 402. These data structures 600 may include, within the cloud allocation optimizer 504, an incoming cloud requests queue 602 which maintains a queued list of incoming cloud resource requests in the local cluster 402. The data structures 600 may include an in-progress cloud request queue 604 of all cloud resource requests currently in-progress in the local cluster 402. The data structures 600 may further include a cloud host list 606 of all cloud hosts 404 that are currently allocated to the local cluster 402. Finally, the data structures 600 may additionally include a cloud hosts release queue 608 of cloud hosts which are to be released within a given time interval from the local cluster 402. Of course, the skilled artisan will recognize that additional or fewer data structures may be present in a given specific implementation, and that the number of data structures 600 given in FIG. 6 are provided only for illustrative convenience.

According to some embodiments, various types of constraints within the cloud bursting environment are considered, including both resource constraints and budget constraints. When considering the resource constraints, a global or overall resource limit may be enforced. This global or overall resource limit may implement a limit on the maximum number of cloud hosts 404 that can be provisioned at any given instant in time. In another aspect, a local/fine-grained resource limit may be enforced. This local resource limit may apply to specific types of cloud resources and limit the maximum number of cloud hosts of a specific type that can be provisioned at any given instant in time.

The budget constraints may be implemented on a variety of levels. For example, coarse-grained budget limits may be enforced on an organizational or functional unit level. Fine-grained budget limits may, on the other hand, be enforced at an application level. Further, the budget limits may be of differing types. One type of budget limit is a hard limit, which is a budget allotment that cannot be exceeded. Another type of budget limit is a soft limit, which may (in some situations) be exceeded up to a 'budget carry-over' limit, for example.

In connection with various functionality described in the present disclosure, the following definitions are provided:

BudgetTimeWindow: A defined budget time interval, window or period (e.g., monthly, annually)

ElapsedTime: An elapsed time since the start of the current BudgetTimeWindow

RemainingTime=BudgetTimeWindow−ElapsedTime

BudgetLimit: An overall budget limit for BudgetTimeWindow

BudgetThresholdLimit: A budget threshold limit beyond which the system needs to carefully regulate the usage of the remaining budget to prevent overshooting the budget limit AllocationTime: A time when a cloud host was allocated ReleaseTime: A time when a cloud host is released CloudHostRentingPeriod: A time interval from AllocationTime to ReleaseTime of a cloud host Additionally, the mechanisms of the present invention assume that once triggered, cloud requests cannot be cancelled nor modified. This is typical of the way most cloud providers operate currently, and this limitation has a significant impact on the management of cloud resource usage within budget constraints.

Algorithm for Computing Remaining Available Budget

With the foregoing definitions in view, an algorithm is now considered for, at any given instant int time, computing a remaining available budget. Initially, however, it should be noted that, at the any given instant in time, the cost components affecting budget utilization are:

CostOfAllocatedAndReleasedHosts: Cost (incurred in the current BudgetTimeWindow up to this instant) of cloud hosts 404 that were released in the current budget window. These cloud hosts 404 may have been allocated in the current time window, or a previous time window provided they were released in the current time window. This cost is definitive (i.e., not estimated) because the CloudHostRenting period of the cloud host 404 is known. The cost incurred in the current budget window can therefore be computed.

CurrentCostOfAllocatedButNotYetReleasedHosts: Cost (incurred in the current BudgetTimeWindow up to this instant) of cloud hosts allocated from the cloud provider 406 to the local cluster 402, but not yet released. These cloud hosts 404 may have been allocated in this time window or a previous time window, and this cost is also definitive, as the cost of cloud hosts 404 from the beginning of the BudgetTimeWindow until the current instant is known.

CostEstimateOfAllocatedButNotYetReleasedHosts: Estimated cost (for the RemainingTime) of cloud hosts 404 that are allocated to the local cluster 402, and not yet released. For cloud hosts 404 that are currently allocated, the release time of these hosts is an unknown, as they are currently performing various computational workloads. For cost computations, the release time therefore must be estimated, and two options are provided for the estimation:

Option 1 (Safe): Assume that the cloud host 404 will remain allocated for the entire RemainingTime; or Option 2 (Estimate): Estimate the approximate time when this cloud host 404 will be released.

CostEstimateOfInprogressRequests: Estimated cost of cloud hosts requests that are in progress but not yet allocated. This cost is unknown, as the allocation times and release times of these cloud hosts 404 are unknown. Thus, the AllocationTime and the ReleaseTime for all these cloud hosts 404 must be estimated with the following two options:

Option 1 (Safe): Assume that all the in-progress requests will be satisfied in the next instant and that all the cloud hosts 404 will remain allocated for the entire duration of the BudgetTimeWindow; or Option 2 (Estimate): Estimate the approximate time when these cloud hosts 404 will be allocated and released.

Utilizing these cost components, the remaining available budget may be computed as follows:

UsedBudget=CostOfAllocatedAndReleasedHosts+
CostOfAllocatedHostsButNotYetReleasedHosts The UsedBudget represents the total cost of all cloud hosts 404 in the current BudgetTimeWindow.

RemainingBudget=BudgetLimit−UsedBudget

The RemainingBudget represents the actual budget remaining at a given instant within the budget window. However, the RemainingBudget calculated above cannot be safely utilized for incoming cloud hosts requests because there are additional costs that need to be considered. These costs include a cost estimate equaling a cost estimate of in-progress requests and a cost estimate of currently allocated (but not yet released) cloud hosts 404, depicted as:

CostEstimate=CostEstimateOfInprogressRequests:+
CostEstimateOfAllocatedButNotYetReleased-
Hosts Once the CostEstimate has been computed and considered, a final RemainingBudgetSafeEstimate may then be computed as:

RemainingBudgetSafeEstimate=RemainingBudget−
CostEstimate.

The RemainingBudgetSafeEstimate can be safely utilized to service incoming cloud hosts requests without overshooting the budget limit, as it both takes into consideration the known, definitive costs of the remaining budget as well as the estimated costs of currently allocated cloud hosts 404 and in-progress requests.

To estimate the costs of in-progress requests and allocated but not yet released hosts, one solution is to use the 'Safe' option mentioned previously. However, the safe option may unnecessarily hinder resource allocation to ensure that the budget is not exceeded. Therefore, another solution is to estimate the approximate time when the cloud hosts 404 will be allocated and released. One way to obtain an estimation is by profiling cloud host usage patterns in the local cluster 402.

Profiling Cloud Hosts within the Cluster

To determine as accurate estimation as practical for the allocation time and release time of the cloud hosts 404, the profiling activity within the local cluster 402 involves multiple stages. A first stage in profiling the cloud hosts 404 may comprise accumulating profiling information, as depicted in the profiling collection mechanism 700 of FIG. 7. Within the profiling mechanism 700, a record may be associated with each cloud host 404, where the record may consist of the following attributes listed in Table 1:

TABLE 1

| Profiling Attributes for Cloud Hosts |  |
| --- | --- |
| 1. | Requesting entity |
| 2. | Cloud Provider |
| 3. | Host Type |
| 4. | Types of applications that ran on host |
| 5. | Cost of host |
| 6. | Average Utilization |
| 7. | Allocation time of thy |
| 8. | Renting Period |

Figure 7:
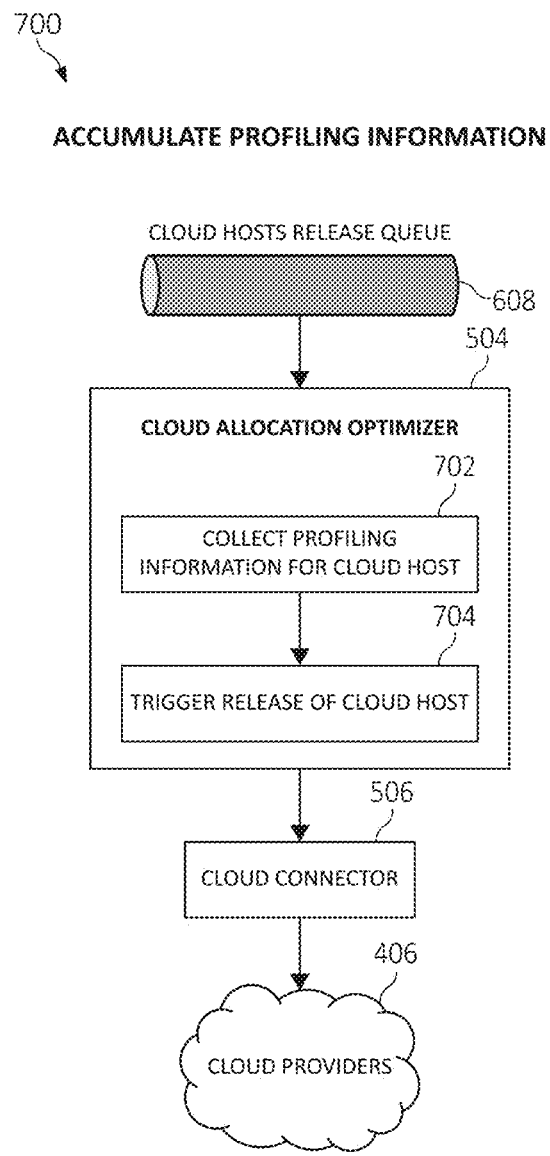
FIG. 7 is a combination flowchart/block diagram depicting the collection of profiling information in a cloud bursting environment, according to embodiments of the present invention

This record, as depicted in Table 1, is created when the cloud host 404 is provisioned to the local cluster 402, and the profiling information is collected when the cloud host 404 is released. Accordingly, as illustrated in FIG. 7, the cloud hosts release queue 608 is monitored by the cloud allocation optimizer 504 to perform the steps of collecting profiling information for each cloud host 404 (step 702) and thereafter triggering the release of the cloud host 404 (step 704). The cloud allocation optimizer 504 then sends the release information to the cloud connector 506 which communicates with the cloud providers 406 to release the cloud host 404.

Figure 8:
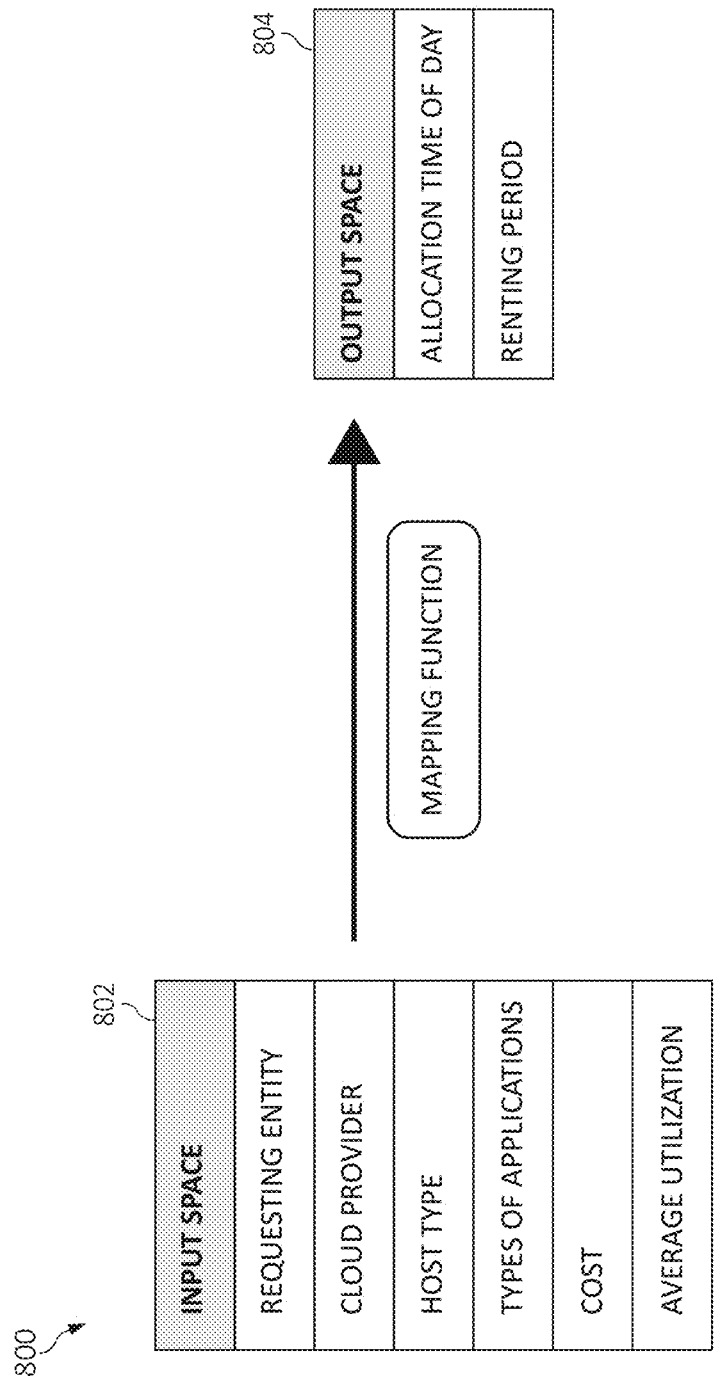
FIG. 8 is a block diagram depicting a learned mapping function in a cloud bursting environment, according to embodiments of the present invention.

Following the accumulation of profiling information of released cloud hosts 404, a mapping function is learned to associate various information collected in the profiling information with allocation time and period information which may be useful in estimating the costs specified previously. In particular, and as shown in the mapping function 800 of FIG. 8, an optimal mapping is created to map the input space 802 of the mapping function 800 (having the specified profiling attributes) to an output space 804 of 'Allocation time of day' and 'Renting Period'. That is, given the input attributes, an association may be formed to determine at what time of day (and/or week, month) the cloud hosts 404 were previously allocated, and for what duration of time (how long) were they allocated. For learning this mapping, a large variety of machine learning and statistical mechanisms such as regression algorithms and neural network algorithms may be employed.

In various embodiments, the profiling information and mapping may then be used for several different functions. In one aspect, the profiled information may be used to estimate the ReleaseTime of an allocated cloud host 404 of a type that was previously profiled. In another aspect, the profiled information may be used to estimate the AllocationTime and RentingPeriod for cloud hosts 404 where provisioning is in-progress or for incoming cloud resource requests. In still a further aspect, the profiled information may be used to estimate the cost of allocated cloud hosts 404, and incoming and in-progress cloud hosts requests.

Figure 9:
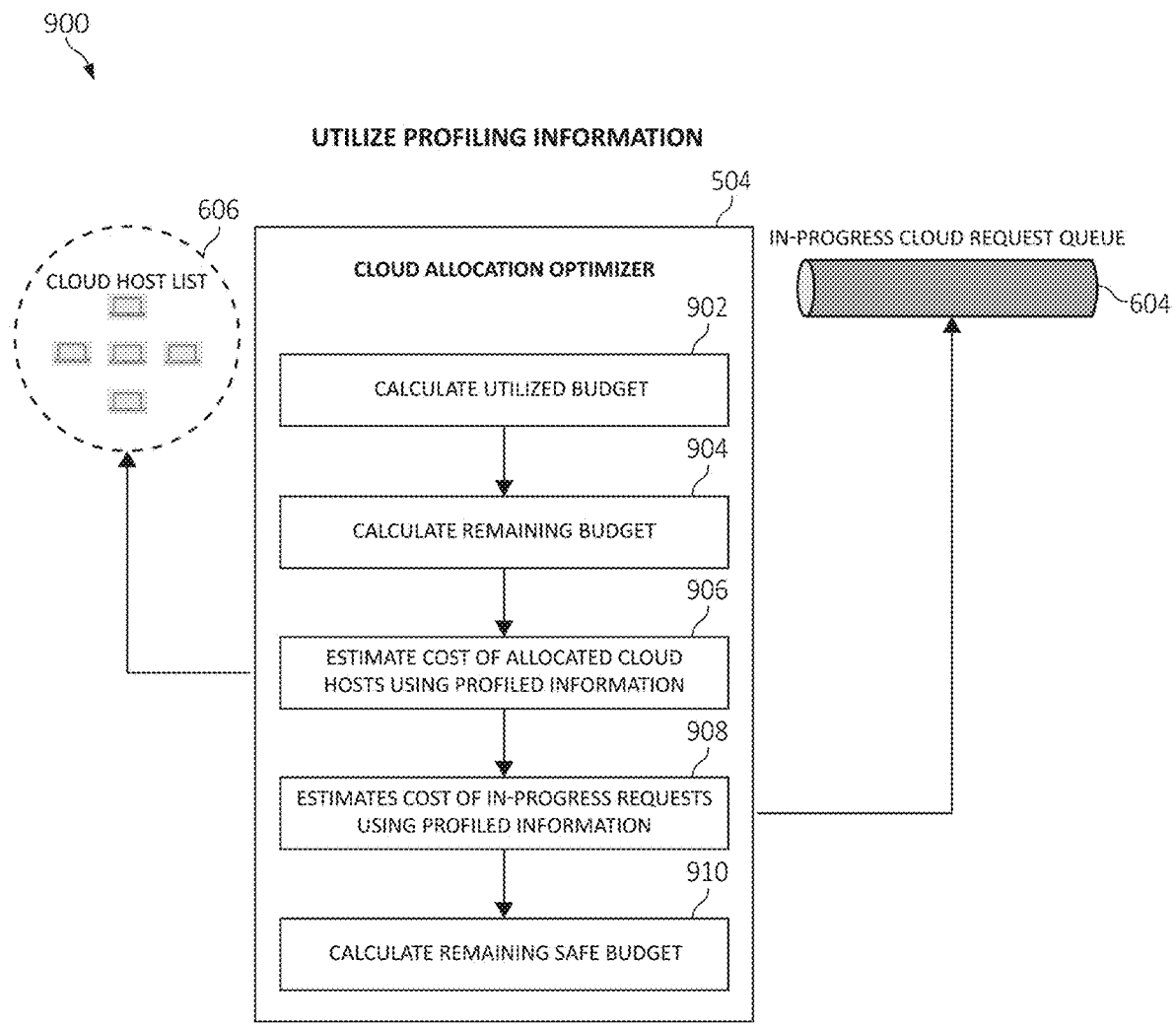
FIG. 9 is a combination flowchart/block diagram depicting the utilization of profiling information in a cloud bursting environment, according to embodiments of the present invention.

FIG. 9 illustrates the utilization mechanism 900 for utilizing the collected profiled information for cloud hosts 404. In some embodiments as depicted in mechanism 900, the cloud allocation optimizer 504 obtains the cloud host list 606 of cloud hosts 404 and in-progress cloud request queue 604. The cloud allocation optimizer 504 then performs the steps of calculating the utilized budget (step 902) by computing a sum of the cost of the allocated and released cloud hosts 404 and the cost of the allocated but not yet released cloud hosts 404. A remaining budget is then determined (step 904) by subtracting the defined budget limit by the utilized budget just identified. The cloud allocation optimizer 504 then estimates a cost of the allocated cloud hosts 404 using the profiled information associated with each cloud host 404 (in another embodiment, the 'Safe' estimate may be utilized) (step 906). A cost estimate of in-progress requests is then determined (step 908), again, using the profiled information associated with each released cloud host 404. This cost estimate comprises the sum of the cost estimate of all in-progress requests (as identified in the in-progress request queue 604) and the cost estimate of the allocated but not yet released cloud hosts 404. Finally, the cloud allocation optimizer 504 computes a remaining safe budget (step 910) as a difference between the remaining budget previously found in step 904 and the overall cost estimate found subsequent to step 908. It should be noted that, once the remaining safe budget is determined, the remaining safe budget may be presented to an administrator (i.e., via a user interface), and/or used to more efficiently and automatically provision and de-provision cloud hosts 404 to the local cluster 402 for a given workload.

Figure 10:
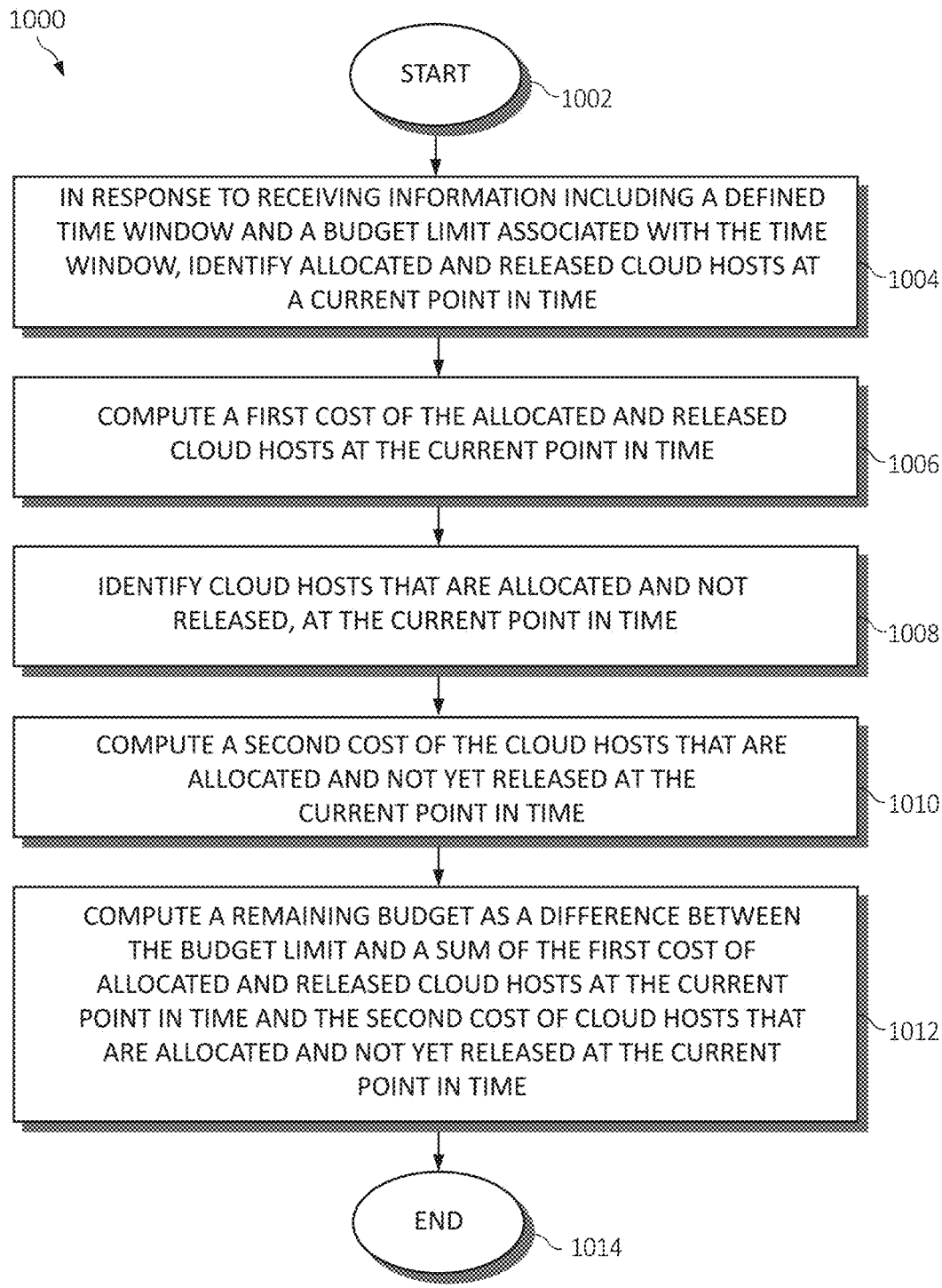
FIG. 10 is a flowchart diagram depicting a computer-implemented method for calculating a remaining budget in a cloud bursting environment, according to embodiments of the present invention.

Turning now to FIG. 10, a method 1000 for calculating a remaining budget in a cloud bursting environment is depicted, in which various aspects of the illustrated embodiments may be implemented. The functionality of the method 1000 may be executed as instructions on a machine, where the instructions are embodied on a tangible, non-transitory machine-readable storage medium. The method 1000 begins at step 1002. In some embodiments, in response to receiving information including a defined time window and a budget limit associated with the time window, allocated and released cloud hosts 404 (to/from the local cluster 402) are identified at a current point in time (step 1004). A first cost is computed of the allocated and released cloud hosts 404 at the current point in time (step 1006). Cloud hosts 404 that are allocated and not yet released are identified, at the current point in time (step 1008). A second cost is computed of the cloud hosts 404 that are allocated and not yet released at the current point in time (step 1010). A remaining budget is computed as a difference between the budget limit and a sum of the first cost of allocated and released cloud hosts 404 at the current point in time and the second cost of cloud hosts 404 that are allocated and not yet released at the current point in time (step 1012). The method 1000 ends (step 1014).

In some embodiments, and in conjunction with the method 1000:
an estimated cost may be calculated of cloud hosts 404 that are allocated and not yet released,
an estimated cost may be calculated of cloud hosts requests that are in progress, and
a safe remaining budget may be calculated as the difference between the remaining budget and the two estimated costs, wherein the safe remaining budget can be safely utilized to service incoming cloud hosts requests without overshooting the budget limit.

In some embodiments, and in conjunction with the method 1000, when considering the cost of allocated and released cloud hosts 404, at least one of the following applies:
the cost is incurred in the current time window until the current instant in time,
the cost includes the costs of cloud hosts 404 that were released in the current time window, wherein these hosts may have been allocated in this time window or a previous time window, and the cost is definitive.

In some embodiments, and in conjunction with the method 1000, when considering the cost of cloud hosts 404 that are allocated and not yet released, at least one of the following applies:
the cost is incurred in the current time window until the current instant in time,
the cost includes the costs of cloud hosts 404 that have not yet been released, wherein these hosts may have been allocated in this time window or a previous time window, and
the cost is definitive.

In some embodiments, and in conjunction with the method 1000, when considering the estimated cost of cloud hosts 404 that are allocated and not yet released, at least one of the following applies:
the cost is an estimate as the release times of these hosts are unknown and should be estimated, estimating the cost can be applied by assuming that the cloud hosts 404 will remain allocated for the entire duration to of the time window, and
estimating the cost can be applied by approximating the time that the cloud hosts 404 will be released.

In some embodiments, and in conjunction with the method 1000, when considering the estimated cost of cloud hosts requests that are in progress, at least one of the following applies:
the cost includes the costs of cloud hosts requests that are in progress and not yet allocated, the cost is an estimate as the allocation times and release times of these cloud hosts 404 are unknown and should be estimated,
estimating the cost can be applied by assuming that all the in-progress requests will be satisfied in the next instant and that all the cloud hosts provisioned by the in-progress requests will remain allocated for the entire duration to of the time window, and
estimating the cost can be applied by approximating the time that the cloud hosts 404 provisioned by the in-progress requests will be allocated and released.

In some embodiments, and in conjunction with the method 1000, estimating the cost of cloud hosts 404 that are allocated and not yet released and estimating the cost of cloud hosts requests that are in progress further includes estimating the times when the cloud hosts will be allocated and released, by applying at least one of:
profiling cloud host usage of cloud hosts 404 that have been released,
including in a profiling record of a cloud host attributes one or more attributes such as: requesting entity, cloud provider, host type, types of applications that ran on the host, cost of the host, average utilization, allocation time of day, and renting period,
learning a mapping function to map profiling attributes to at least one of: allocation time of day, and renting period, and
using machine learning or statistical algorithms for learning the mapping.

In some embodiments, and in conjunction with the method 1000, the mapping function may be used for at least one of:
estimating a release time for an allocated cloud host 404 of a type that was previously profiled, estimating an allocation time and a renting period for a cloud host whose provisioning is in progress and for incoming cloud hosts requests, and
estimating the cost of allocated cloud hosts 404, incoming cloud hosts requests, and in-progress cloud hosts requests.

In some embodiments, and in conjunction with the method 1000, the cloud bursting mechanism may be applied for performing at least one of:

configuring a cluster workload monitor module to monitor the workload in the local cluster 402 and generate cloud resource requests required to meet the workload service level agreements, configuring a cloud allocation optimizer module to aggregate and optimize all the cloud hosts requests triggered by the cloud workload monitor considering to satisfy resource requirements and budget constraints, and configuring a cloud connector to connect with external cloud providers 406 to trigger cloud host 404 provisioning.

In some embodiments, and in conjunction with the method 1000, the cloud bursting mechanism may be applied for performing at least one of:

configuring a list of incoming cloud hosts requests, configuring a list of in-progress cloud hosts requests, configuring a list of cloud hosts 404 that are currently allocated, and configuring a list of cloud hosts 404 which are allocated and are to be released.

It should be noted that, as it pertains to the present invention, any machine learning/deep learning model and/or algorithm may be employed in context with the functionality described herein. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMIDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method for calculating a remaining budget in a cloud bursting environment, by a processor, comprising:
in response to receiving information including a defined time window and a budget limit associated with the time window, identifying allocated and released cloud hosts assigned to a local cluster at a current point in time, wherein the released cloud hosts include cloud hosts that were released at any point within the defined time window;
computing a first cost of the allocated and released cloud hosts at the current point in time, wherein the first cost includes those cloud hosts that were released within the defined time window, which were allocated within the defined time window or a previous time window;
identifying cloud hosts that are allocated and not yet released, at the current point in time;
computing a second cost of the cloud hosts that are allocated and not yet released at the current point in time, wherein the second cost includes those cloud hosts that have not been released within the defined time window, which were allocated within the defined time window or the previous time window; and
computing a remaining budget as a difference between the budget limit and a sum of the first cost of allocated and released cloud hosts at the current point in time and the second cost of cloud hosts that are allocated and not yet released at the current point in time.

2. The method of claim 1, further comprising:
computing a first estimated cost of the cloud hosts that are allocated and not yet released;
computing a second estimated cost of cloud hosts requests that are in progress; and
computing a safe remaining budget as the difference between the remaining budget and the first estimated cost and the second estimated cost, wherein the safe remaining budget is safely utilized to service incoming cloud hosts requests without overshooting the budget limit.

3. The method of claim 1, wherein:
for the first cost of the allocated and released cloud hosts, at least one of:
the first cost is incurred in the defined time window until the current point in time, and
the first cost is definitive; and
for the second cost of the cloud hosts that are allocated and not yet released, at least one of:
the second cost is incurred in the defined time window until the current point in time, and
the second cost is definitive.

4. The method of claim 2, wherein, for the first estimated cost of the cloud hosts that are allocated and not yet released, at least one of:
estimating the first estimated cost is applied by assuming that the cloud hosts that are allocated and not yet released will remain allocated for an entire duration to of the defined time window;
estimating the first estimated cost is applied by approximating a time that the cloud hosts that are allocated and not yet released will be released.

5. The method of claim 4, wherein, for the second estimated cost of the cloud hosts requests that are in progress, at least one of:
estimating the second estimated cost is applied by assuming that all in-progress requests will be satisfied and that all cloud hosts provisioned by the in-progress requests will remain allocated for the entire duration to of the defined time window; and
estimating the second estimated cost is applied by approximating the time that the cloud hosts provisioned by the in-progress requests will be allocated and released.

6. The method of claim 5, wherein estimating the first estimated cost of the cloud hosts that are allocated and not yet released and estimating the second estimated cost of cloud hosts requests that are in progress further includes estimating a cloud host allocation time and a release time, by at least one of:

maintaining a profiling record of cloud host attributes, the cloud host attributes including at least one of: a requesting entity, a cloud provider, a host type, types of applications executed on a respective cloud host, cost of the respective cloud host, an average utilization, an allocation time of day, and a renting period; and using machine learning or statistical algorithms to learn a mapping function to map profiling attributes to at least one of: an allocation time of day, and a renting period.

7. The method of claim 2, further comprising utilizing the safe remaining budget for at least one of:

configuring a cluster workload monitor module to monitor the workload in the cluster and generate cloud resource requests required to meet workload service level agreements;

configuring a cloud allocation optimizer module to aggregate and optimize all the cloud resource requests triggered by the cloud workload monitor while satisfying resource requirements and budget constraints;

configuring a cloud connector to connect with external cloud providers to trigger cloud host provisioning.

8. A system for calculating a remaining budget in a cloud bursting environment, comprising:

a processor executing instructions stored in a memory device; wherein the processor:

in response to receiving information including a defined time window and a budget limit associated with the time window, identifies allocated and released cloud hosts assigned to a local cluster at a current point in time, wherein the released cloud hosts include cloud hosts that were released at any point within the defined time window;

computes a first cost of the allocated and released cloud hosts at the current point in time, wherein the first cost includes those cloud hosts that were released within the defined time window, which were allocated within the defined time window or a previous time window;

identifies cloud hosts that are allocated and not yet released, at the current point in time;

computes a second cost of the cloud hosts that are allocated and not yet released at the current point in time, wherein the second cost includes those cloud hosts that have not been released within the defined time window, which were allocated within the defined time window or the previous time window; and computes a remaining budget as a difference between the budget limit and a sum of the first cost of allocated and released cloud hosts at the current point in time and the second cost of cloud hosts that are allocated and not yet released at the current point in time.

9. The system of claim 8, wherein the processor:

computes a first estimated cost of the cloud hosts that are allocated and not yet released;

computes a second estimated cost of cloud hosts requests that are in progress; and computes a safe remaining budget as the difference between the remaining budget and the first estimated cost and the second estimated cost, wherein the safe remaining budget is safely utilized to service incoming cloud hosts requests without overshooting the budget limit.

10. The system of claim 8, wherein:

for the first cost of the allocated and released cloud hosts, at least one of:
the first cost is incurred in the defined time window until the current point in time, and
the first cost is definitive; and for the second cost of the cloud hosts that are allocated and not yet released, at least one of:
the second cost is incurred in the defined time window until the current point in time, and
the second cost is definitive.

11. The system of claim 9, wherein, for the first estimated cost of the cloud hosts that are allocated and not yet released, at least one of:

estimating the first estimated cost is applied by assuming that the cloud hosts that are allocated and not yet released will remain allocated for an entire duration to of the defined time window;

estimating the first estimated cost is applied by approximating a time that the cloud hosts that are allocated and not yet released will be released.

12. The system of claim 11, wherein, for the second estimated cost of the cloud hosts requests that are in progress, at least one of:

estimating the second estimated cost is applied by assuming that all in-progress requests will be satisfied and that all cloud hosts provisioned by the in-progress requests will remain allocated for the entire duration to of the defined time window; and estimating the second estimated cost is applied by approximating the time that the cloud hosts provisioned by the in-progress requests will be allocated and released.

13. The system of claim 12, wherein estimating the first estimated cost of the cloud hosts that are allocated and not yet released and estimating the second estimated cost of cloud hosts requests that are in progress further includes estimating a cloud host allocation time and a release time, by at least one of:

maintaining a profiling record of cloud host attributes, the cloud host attributes including at least one of: a requesting entity, a cloud provider, a host type, types of applications executed on a respective cloud host, cost of the respective cloud host, an average utilization, an allocation time of day, and a renting period; and using machine learning or statistical algorithms to learn a mapping function to map profiling attributes to at least one of: an allocation time of day, and a renting period.

14. The system of claim 9, wherein the processor utilizes the safe remaining budget for at least one of:

configuring a cluster workload monitor module to monitor the workload in the cluster and generate cloud resource requests required to meet workload service level agreements;

configuring a cloud allocation optimizer module to aggregate and optimize all the cloud resource requests triggered by the cloud workload monitor while satisfying resource requirements and budget constraints;

configuring a cloud connector to connect with external cloud providers to trigger cloud host provisioning.

15. A computer program product for calculating a remaining budget in a cloud bursting environment, the computer program product comprising a non-transitory computer-readable storage medium having computer-readable program code portions stored therein, the computer-readable program code portions comprising:
- an executable portion that, in response to receiving information including a defined time window and a budget limit associated with the time window, identifies allocated and released cloud hosts assigned to a local cluster at a current point in time, wherein the released cloud hosts include cloud hosts that were released at any point within the defined time window;
- an executable portion that computes a first cost of the allocated and released cloud hosts at the current point in time, wherein the first cost includes those cloud hosts that were released within the defined time window, which were allocated within the defined time window or a previous time window;
- an executable portion that identifies cloud hosts that are allocated and not yet released, at the current point in time;
- an executable portion that computes a second cost of the cloud hosts that are allocated and not yet released at the current point in time, wherein the second cost includes those cloud hosts that have not been released within the defined time window, which were allocated within the defined time window or the previous time window; and
- an executable portion that computes a remaining budget as a difference between the budget limit and a sum of the first cost of allocated and released cloud hosts at the current point in time and the second cost of cloud hosts that are allocated and not yet released at the current point in time.

16. The computer program product of claim 15, further including an executable portion that:
- computes a first estimated cost of the cloud hosts that are allocated and not yet released;
- computes a second estimated cost of cloud hosts requests that are in progress; and
- computes a safe remaining budget as the difference between the remaining budget and the first estimated cost and the second estimated cost, wherein the safe remaining budget is safely utilized to service incoming cloud hosts requests without overshooting the budget limit.

17. The computer program product of claim 15, wherein:
for the first cost of the allocated and released cloud hosts, at least one of:
- the first cost is incurred in the defined time window until the current point in time, and
- the first cost is definitive; and for the second cost of the cloud hosts that are allocated and not yet released, at least one of:
- the second cost is incurred in the defined time window until the current point in time, and
- the second cost is definitive.

18. The computer program product of claim 16, wherein, for the first estimated cost of the cloud hosts that are allocated and not yet released, at least one of:
- estimating the first estimated cost is applied by assuming that the cloud hosts that are allocated and not yet released will remain allocated for an entire duration to of the defined time window;
- estimating the first estimated cost is applied by approximating a time that the cloud hosts that are allocated and not yet released will be released.

19. The computer program product of claim 18, wherein, for the second estimated cost of the cloud hosts requests that are in progress, at least one of:
- estimating the second estimated cost is applied by assuming that all in-progress requests will be satisfied and that all cloud hosts provisioned by the in-progress requests will remain allocated for the entire duration to of the defined time window; and
- estimating the second estimated cost is applied by approximating the time that the cloud hosts provisioned by the in-progress requests will be allocated and released.

20. The computer program product of claim 19, wherein estimating the first estimated cost of the cloud hosts that are allocated and not yet released and estimating the second estimated cost of cloud hosts requests that are in progress further includes estimating a cloud host allocation time and a release time, by at least one of:
- maintaining a profiling record of cloud host attributes, the cloud host attributes including at least one of: a requesting entity, a cloud provider, a host type, types of applications executed on a respective cloud host, cost of the respective cloud host, an average utilization, an allocation time of day, and a renting period; and
- using machine learning or statistical algorithms to learn a mapping function to map profiling attributes to at least one of: an allocation time of day, and a renting period.

21. The computer program product of claim 16, further including an executable portion that utilizes the safe remaining budget for at least one of:
- configuring a cluster workload monitor module to monitor the workload in the cluster and generate cloud resource requests required to meet workload service level agreements;
- configuring a cloud allocation optimizer module to aggregate and optimize all the cloud resource requests triggered by the cloud workload monitor while satisfying resource requirements and budget constraints;
- configuring a cloud connector to connect with external cloud providers to trigger cloud host provisioning.

* * * * *